US012394287B2

(12) United States Patent
Jaeger et al.

(10) Patent No.: US 12,394,287 B2
(45) Date of Patent: Aug. 19, 2025

(54) APPARATUS, METHOD AND COMPUTER PROGRAM FOR IDENTIFYING ACOUSTIC EVENTS, IN PARTICULAR ACOUSTIC INFORMATION AND/OR WARNING SIGNALS

(71) Applicant: YOUR HOME GUIDES GMBH, Leer (DE)

(72) Inventors: Hagen Thomas Jaeger, Bendorf (DE); Thomas Künzl, Oldenburg (DE); Jan Hinnerk Pleis, Leer (DE)

(73) Assignee: YOUR HOME GUIDES GMBH, Leer (DE)

( * ) Notice: Subject to any disclaimer, the term of this patent is extended or adjusted under 35 U.S.C. 154(b) by 284 days.

(21) Appl. No.: 17/998,226

(22) PCT Filed: May 10, 2021

(86) PCT No.: PCT/EP2021/062367
§ 371 (c)(1),
(2) Date: Nov. 8, 2022

(87) PCT Pub. No.: WO2021/224508
PCT Pub. Date: Nov. 11, 2021

(65) Prior Publication Data

US 2023/0306828 A1 Sep. 28, 2023

(30) Foreign Application Priority Data

May 8, 2020 (DE) ..................... 10 2020 112 575.5

(51) Int. Cl.
*G08B 7/06* (2006.01)
*H04R 25/00* (2006.01)

(52) U.S. Cl.
CPC ............. *G08B 7/06* (2013.01); *H04R 25/505* (2013.01); *H04R 25/606* (2013.01); *H04R 2225/55* (2013.01)

(58) Field of Classification Search
CPC ...... G08B 7/06; H04R 25/505; H04R 25/606; H04R 2225/55; H04R 25/554; H04R 3/00; H04R 2430/03
See application file for complete search history.

(56) References Cited

U.S. PATENT DOCUMENTS

2012/0169454 A1* 7/2012 Petersen .............. H04R 1/1091 340/4.1
2014/0079372 A1* 3/2014 Zhang .................... G06V 20/49 386/E5.032

(Continued)

OTHER PUBLICATIONS

Büchler, Michael Christoph, "Algorithms for sound classification in hearing instruments," Swiss Federal Institute of Technology Zurich, PhD dissertation, 2002, 150 pages.

(Continued)

*Primary Examiner* — Carolyn R Edwards
*Assistant Examiner* — Julie X Dang
(74) *Attorney, Agent, or Firm* — Seed Intellectual Property Law Group LLP

(57) ABSTRACT

The present invention relates to an apparatus and a method for identifying acoustic events, in particular acoustic information and/or warning signals, comprising an electroacoustic transducer, in particular a microphone, configured to identify an acoustic event, in particular an acoustic information and/or warning signal, by way of airborne sound, a computing unit, configured to take the acoustic event, in particular the acoustic information and/or warning signal, and create at least one piece of abstracted information that is indicative of the acoustic event, in particular the acoustic information and/or warning signal, or displays the acoustic (Continued)

event, in particular the acoustic information and/or warning signal, and a transmitting unit, configured to transfer the at least one piece of abstracted information to a terminal, in particular in order to indicate the acoustic event, in particular the acoustic information and/or warning signal, on the terminal.

12 Claims, 5 Drawing Sheets

(56) References Cited

U.S. PATENT DOCUMENTS

| | | | | |
|---|---|---|---|---|
| 2015/0341735 | A1* | 11/2015 | Kitazawa | H04S 5/00 381/17 |
| 2016/0360384 | A1* | 12/2016 | Park | H03G 3/3005 |
| 2020/0135207 | A1* | 4/2020 | Topaloglu | G10L 15/26 |

OTHER PUBLICATIONS

Wang et al., “Mixed Sound Event Verification on Wireless Sensor Network for Home Automation,” IEEE Transactions on Industrial Informatics 10(1):803-812, 2014.

* cited by examiner

Decentralized Network

Blockchain

APPARATUS, METHOD AND COMPUTER PROGRAM FOR IDENTIFYING ACOUSTIC EVENTS, IN PARTICULAR ACOUSTIC INFORMATION AND/OR WARNING SIGNALS

BACKGROUND

Technical Field

The present invention relates to an apparatus and a method for identifying acoustic events, in particular acoustic information and/or warning signals.

Description of the Related Art

An example of an acoustic information and/or warning signal such as this is the ringing of a doorbell or telephone, or the alarm of a smoke alarm.

Acoustic information and/or warning signals such as these cannot always be detected by human beings, for example because they are engrossed in their work on account of a home office, for example as a result of "deep work" strategies, or because they are too far away and cannot, or can hardly, hear.

Usually, in particular the latter human beings use expensive static aids that in some cases need to be installed in the residence in complex fashion. Other solutions often cannot immediately be reused in the event of a residential move, which means that a fresh, costly installation likewise needs to be carried out in the new residence. Furthermore, these solutions do not have an inclusive approach, but rather blatantly, and from a marketing perspective, separate human beings into old and young and into people with and without impaired hearing.

BRIEF SUMMARY

Provided is an apparatus, which may be a mobile apparatus, that conditions acoustic information and/or warning signals for anyone.

An apparatus for identifying acoustic events, in particular acoustic information and/or warning signals, is proposed, comprising: an electroacoustic transducer, configured to capture an acoustic event, in particular an acoustic information and/or warning signal, by way of airborne sound, a computing unit, configured to take the acoustic event, in particular the acoustic information and/or warning signal, and create at least one piece of abstracted information that is indicative of the acoustic event, in particular the acoustic information and/or warning signal, or displays the acoustic event, in particular the acoustic information and/or warning signal, and a transmitting unit, configured to transfer the at least one piece of abstracted information to a terminal, in particular in order to indicate the acoustic event, in particular the acoustic information and/or warning signal, on the terminal.

The electroacoustic transducer therefore comprises for example a microphone or is in the form of a microphone and/or is configured to generate an electronic transducer signal from an acoustic event. The electroacoustic transducer is preferably designed to generate an electrical transducer signal from an acoustic event.

The electroacoustic transducer, or the microphone, preferably has an omnidirectional polar pattern.

The electroacoustic transducer, or the microphone, preferably has a dynamic range of between 90 and 130 dB (decibels), for example 105 dB.

The electroacoustic transducer, or the microphone, preferably has a THD (total harmonic distortion) of less than 1%, in particular for a sound pressure level of or up to 128 dBSPL (decibels of sound pressure level).

The electroacoustic transducer, or the microphone, is preferably highly dynamic, in particular such that even loud sounds, such as for example the sounds from a smoke alarm at 120 dB, can be captured substantially without noise and distortion.

The electroacoustic transducer, or the microphone, preferably has a flat frequency response, for example from below 35 Hz, preferably approximately 28 Hz.

In a particularly preferred embodiment, the electroacoustic transducer comprises an MEMS (microelectromechanical sensor) microphone or is in the form of an MEMS microphone and/or configured to generate an electronic transducer signal from an acoustic event.

MEMS microphones may be understood to be in particular miniaturized (microelectromechanical system) microphones produced using SMD (surface-mounted device) technology that are preferably used directly on electronic circuit boards. A high signal-to-noise ratio, low power consumption and high sensitivity are particularly advantageous in the case of MEMS microphones, in particular given simultaneously small design.

In a particularly preferred embodiment, the data transfer from the electroacoustic transducer, or microphone, takes place via pulse density modulation (PDM). A particular advantage in this case is that sending the data in the bit stream reduces noise and/or the signal transmission is less susceptible to noise.

The electronic transducer signal is then broken down into an image function by means of the computing unit (computer or processor), for example by means of a Fourier transformation, preferably by means of multiple successive short-time Fourier transformations, particularly preferably by means of multiple successive fast short-time Fourier transformations.

In a particularly preferred embodiment, descriptive features are extracted from the image function as a feature vector, preferably using a-priori knowledge. That is to say that it is in particular also proposed not that the entire image function be compared but rather that individual features be compared against one another by means of vectors, that is to say a feature vector of the captured signal against a target vector of the signal to be identified.

The image function, or the feature vector, is then compared for example against an image function, or feature vector, in particular of the target signal, that is deposited in a memory, in particular in order to assign the signal recorded by the microphone to a target signal/to identify said recorded signal. There may also be provision for a filter arranged between the transducer and the computing unit, in particular in order to filter out irrelevant signals, for example, that is to say for example signals that are too short and/or too quiet and/or noise caused for example by the electronic transducer or the acoustic environment.

The image function produced by the computing unit, or the feature vector produced by the computing unit, is furthermore compared against a stored image function, or a stored prototype feature vector of a target signal, using learning vector quantization methods, and, if they substantially match, abstracted information is sent to a terminal, in particular a mobile terminal.

In a particularly preferred embodiment, the comparison thus takes place by means of vectors and/or a learning vector quantization.

By way of example, a contact address for the mobile terminal may be deposited in the apparatus for this purpose.

The mobile terminal is preferably an Internet-compatible terminal, such as, e.g., a smartphone, a tablet, a PC, a laptop, headphones, a smart speaker, a smart TV, a streaming media adapter and/or player and/or box, a smartwatch, a games console, a game streaming service box, VR glasses, AR glasses, MR glasses, a smart lamp, smartglasses, a hearing device, a hearing aid or other IoT device. Mobile terminals such as these furthermore frequently have peripheral devices, such as for example headphones, that then render the abstracted information able to be picked up by human beings, for example by way of video and/or audio signals.

In a more preferred embodiment, the mobile terminal is an implanted hearing device, in particular a cochlear implant.

The apparatus for identifying acoustic events is in the form of a mobile apparatus for this purpose, for example, and may thus easily be arranged beside a doorbell in a residence of a person with impaired hearing, for example on a dresser, a table or in a wall socket. Moreover, a mobile phone number of the person with impaired hearing and an image function, or a feature vector, of the bell of the residence are deposited in the apparatus, for example in a memory. The apparatus uses the microphone to continually detect acoustic signals in the residence and compares said signals against the deposited target signal. If a third party rings the doorbell, the apparatus identifies this and contacts the mobile phone of the person with impaired hearing. The mobile phone then uses vibration and/or an optical alarm, for example, to signal that someone has rung the doorbell.

The apparatus thus makes it possible for example for human beings with impaired hearing to be able to detect acoustic signals, in particular acoustic warning signals.

In a particularly preferred embodiment, the computing unit and the transmitting unit (transmitter) are two different assemblies, in particular each with an independent processor, preferably two different processors. The transmitting unit and the computing unit are preferably connected to one another via a common bus, or a common bus system. The bus is preferably embodied as an $I^2C$ bus. The bus thus has an inter-integrated circuit, that is to say is configured for the communication between embedded systems and/or processors.

The transmitting unit is preferably furthermore configured to transfer at least one piece of abstracted information to the terminal by means of a radio connection, which is in particular routed via a peer-to-peer connection directly to the terminal via a decentralized and constantly plausibilized database (cf. blockchain, 500), alternatively via a server or a cloud.

The abstracted information may thus be conveyed to the terminal either directly or indirectly, for example directly to a specific telephone or smartphone or indirectly via a cloud to a specific smartphone.

Preferably, there may be provision for a peer-to-peer transmission of the signal via a decentralized or distributed and constantly plausibilized database, which may be embodied and/or referred to as blockchain or as Holochain, in particular in order to guarantee the data integrity without confidence in a management structure. One possible area of application in this case is validation of the presence of a bell signal for a package/goods delivery, and establishing the correctness and trustworthiness of this information using the blockchain or Holochain mechanism.

It is therefore also proposed that the abstracted information be stored on a server, for example, in particular in order to allow a data collection. Such a data collection may be useful in retail, for example, where for example the apparatus may be used to document a signal of an entry or motion detector of the shop. Optionally: alternatively or additionally, there may also be provision for a cloud, or cloud infrastructure, that is part of a blockchain, in particular in order to guarantee the data integrity. One possible area of application in this case is validation of the presence of a bell signal for a package/goods delivery.

The abstracted information on the terminal preferably generates a unique acoustic and/or visual signal that is indicative of the acoustic event, in particular the acoustic information and/or warning signal, or displays the acoustic event, in particular the acoustic information and/or warning signal.

It is thus also proposed that the abstracted information generate a unique signal that clearly displays which warning signal is present. In this way, the apparatus is also able to provide information about multiple different information and warning signals, that is to say for example a doorbell, an entry or motion detector or a smoke alarm.

The apparatus preferably further comprises a memory, configured to document acoustic events, in particular acoustic information and/or warning signals, and/or to store in particular deposited signal images.

The apparatus therefore in particular also has a memory, configured to store an image function, or image regions, and feature vectors.

The computing unit preferably breaks down the acoustic event, in particular the acoustic information and/or warning signal, by means of a Fourier transformation, in particular in order to obtain a spectrogram, in order to compare the latter against a deposited signal image.

The computing unit is therefore configured to break down the acoustic signal into an image function by means of multiple short-time Fourier transformations, to extract a feature vector and to compare the latter against a stored feature vector.

It is therefore in particular proposed that the apparatus identify an acoustic signal by means of a data comparison using learning vector quantization methods, in particular by using a prototype function of the feature vector of a target signal, which is deposited in a memory.

The abstracted information is preferably created only if a, or the, spectrogram substantially matches a, or the, deposited signal image.

It is thus in particular proposed that the abstracted information be created only if there is a determined similarity between the feature vector produced and a deposited feature vector. The higher the determined similarity is chosen to be, the lower the probability of the acoustic signal being identified incorrectly.

The computing unit is preferably configured, in particular by means of the microphone, at least to identify the following signals: an acoustic signal of a bell, in particular a front doorbell, an acoustic signal of a smoke alarm and/or gas warning device, of an entry or motion detector, and an acoustic signal of a personal digital assistant.

The apparatus is therefore in particular configured and intended to be used for domestic information and warning signals.

The apparatus preferably further comprises a receiving unit (receiver), configured to receive a signal sent by the mobile terminal as a response to the abstracted information.

It is therefore in particular also proposed that the apparatus have a return channel via which for example the apparatus obtains information from the mobile terminal, for example an acknowledgement that the abstracted information has been received.

The apparatus preferably comprises a receiving unit, which learns, in particular independently (autonomous learning), from user feedback via a user interface on a, or the, mobile terminal (supervised learning) whether and/or when a signal has been correctly identified.

The apparatus is thus in particular configured to independently learn whether signals have been correctly identified.

As a result, it is in particular possible to improve the identification performance of the apparatus. The apparatus preferably further comprises a return channel, configured to receive commands from the terminal and to execute these commands, in particular by means of a voice message.

It is therefore also proposed that the apparatus be configured for example to use the apparatus to conduct a dialog, that is to say for example to respond to the ringing of the doorbell.

The acoustic event is preferably produced by a mechanical and/or electrical apparatus.

The apparatus is therefore in particular configured and intended to capture and evaluate mechanically and/or electrically generated signals, such as for example the signal of an electric doorbell.

The apparatus is preferably not configured and intended for example to capture and/or evaluate human and/or animal sounds, such as for example babies crying.

The capture in this instance may preferably take place in the form of permanent capture, and the data thus obtained may furthermore be sent, in particular streamed, to a terminal directly, for example for evaluation, or indirectly, for example via a cloud that buffer-stores and/or if necessary evaluates the data.

A method for identifying acoustic events, in particular acoustic information and/or warning signals, is furthermore proposed, comprising the steps of: recording airborne sound by means of an electroacoustic transducer, in particular microphone, as a result of which an electronic transducer signal is obtained; breaking down the electronic transducer signal by means of a transformation, in particular multiple successive short-time Fourier transformations, preferably one short-time Fourier transformation, in order to obtain an image function; extracting a feature vector from the image function using a-priori knowledge of the target signal, comparing the feature vector against a stored prototype of the feature vector of the target signal and sending information to a terminal, in particular a mobile terminal, if the feature vector has a determined similarity, computed using the learning vector quantization methods, to the stored prototype of the feature vector of the target signal.

It is thus in particular proposed that the identification be performed by means of vectors, for example by extracting prominent points from the image function using a-priori knowledge relating to prominent points from the target signal in order to create a feature vector from the available signal and subsequently comparing two image functions, by comparing prominent points, interpretable as feature vectors, in particular by means of a learning vector quantization method.

A first step thus comprises generating an electronic transducer signal from airborne sound, in particular an acoustic signal, in particular by means of an electroacoustic transducer.

Next, the electronic transducer signal is broken down into an image function by means of a transformation, or an image function is produced from the electronic transducer signal.

A feature vector is then extracted from this image function using a-priori knowledge relating to the target signal and is compared against a prototype of the feature vector of the target signal.

If this comparison has a determined similarity, information, in particular abstracted information, is sent to a mobile terminal, in particular in order to display an acoustic event.

The feature vector is preferably descriptive of one of the following acoustic signals: the ringing of a doorbell, an information signal of an entry or motion detector and/or a warning signal of a smoke and/or gas alarm.

The method described hereinabove or hereinbelow is therefore used in particular to identify domestic information and warning signals, such as for example of a doorbell or a smoke alarm.

The stored feature vector was preferably produced as a result of an acoustic signal having been broken down by means of a Fourier transformation, preferably a short-time Fourier transformation, and prominent points in the resultant image function having been extracted using a-priori knowledge relating to the target signal.

The stored prototype feature vector is in particular produced in exactly the same way as the feature vector of a recorded airborne sound, as described hereinabove or hereinbelow. This can be accomplished for example by playing a specific acoustic warning signal to the apparatus described hereinabove or hereinbelow in order to initialize the apparatus thereby. In the case of a doorbell, the stored prototype feature vector would thus be obtained by repeatedly operating the bell and storing this signal as a corresponding feature vector.

A computer program product, in particular app, is furthermore proposed, comprising commands that, when executed by a computer, preferably a mobile phone or a tablet computer, cause the computer to perform a method, comprising the steps of: receiving abstracted information that is indicative of the acoustic event, in particular the acoustic information and/or warning signal, or displays the acoustic event, in particular the acoustic information and/or warning signal, comparing the abstracted information against at least one piece of information deposited on the computer, and outputting an acoustic and/or visual signal that is indicative of the acoustic event, in particular the acoustic information and/or warning signal, or displays the acoustic event, in particular the acoustic information and/or warning signal, if the comparison of the abstracted information against the information deposited on the computer is positive.

For this purpose, the computer program product is able to be installed for example on a computer, in particular a mobile phone or a tablet computer.

If the computer now receives abstracted information, for example from an apparatus as described hereinabove or hereinbelow, the computer compares the abstracted information against information deposited on a computer, for example a specific bit sequence that is indicative of a doorbell.

If the received information is the same as the deposited information, an acoustic and/or visual signal is output on the computer, for example a vibration alarm and, on a display, a symbol of a doorbell.

The owner of the computer then knows that someone has rung his doorbell, in particular regardless of what location the owner is at.

The computer program product preferably comprises further commands that, when executed by a computer, preferably a mobile phone or a tablet computer, further cause the computer to: output at least one optical signal that prompts the user of the computer to respond to the abstracted information, for example in order to play back a message by means of an apparatus as claimed in one of the preceding claims or to stream a message.

BRIEF DESCRIPTION OF THE SEVERAL VIEWS OF THE DRAWINGS

The present invention is now explained more thoroughly below by way of example on the basis of exemplary embodiments with reference to the accompanying figures, the same reference signs being used for identical or similar assemblies.

DETAILED DESCRIPTION

Figure 1:
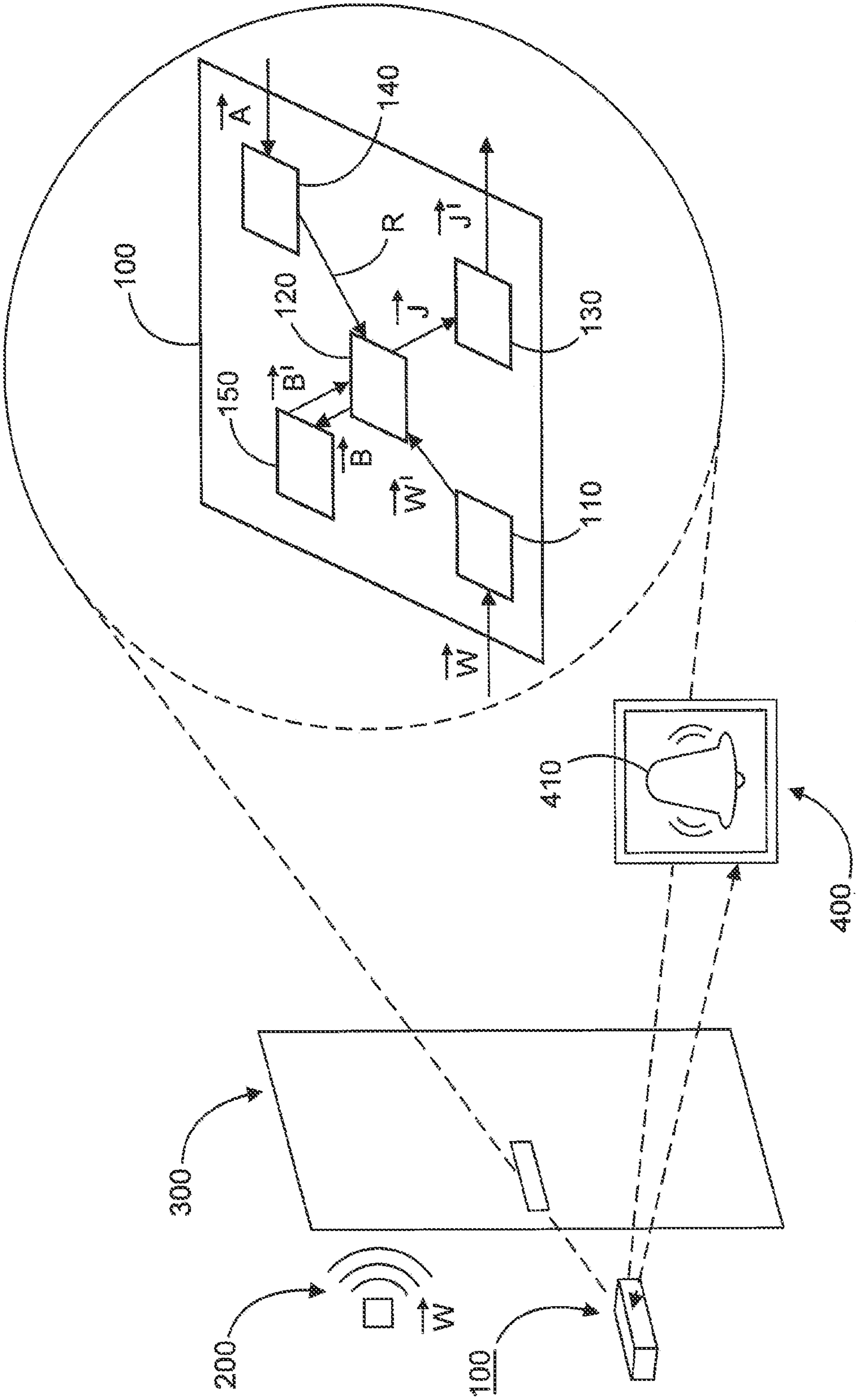
FIG. 1 shows a schematic view of an apparatus for identifying acoustic events in one embodiment.

FIG. 1 shows a schematic view of an apparatus 100 for identifying acoustic events in one embodiment.

The apparatus 100 is arranged for example beside a residence door 300 close to a doorbell 200.

The apparatus 100 comprises at least one electroacoustic transducer 110, a computing unit (computer or processor) 120 and a transmitting unit (transmitter) 130.

The apparatus 100 is therefore configured to identify acoustic events W, in particular information and/or warning signals W.

The electroacoustic transducer 110 is for example in the form of a microphone and configured to identify an acoustic event W, in particular an acoustic information and/or warning signal, for example of a doorbell 200, by way of airborne sound.

The computing unit 120 is configured to take the acoustic event W, in particular the acoustic information and/or warning signal, and create at least one abstracted piece of information I that is indicative of the acoustic event, in particular the acoustic information and/or warning signal, or displays the acoustic event, in particular the acoustic information and/or warning signal.

The transmitting unit 130 is configured to transfer the at least one piece of abstracted information I to a terminal 400, in particular in order to indicate the acoustic event W, in particular the acoustic information and/or warning signal, on the terminal. This is accomplished by means of a visual signal 410, for example.

The abstracted information I' may be transmitted, or sent, from the transmitting unit 130 to the, in particular mobile, terminal directly, for example via a radio connection, or indirectly, for example via a cloud.

In a preferred embodiment, the transmitting unit 130 is moreover configured by means of a return channel to receive information from the terminal, such as for example an acknowledgement that the abstracted information has arrived.

To generate the visual signal 410 on the mobile terminal, it is thus proposed that the acoustic event W be broken down into an electronic signal W' by means of the microphone 110.

This electronic signal W' is broken down into an image function by the computing unit 120, for example by means of a Fourier transformation, said image function, following computation of an associated feature vector B, being compared against a prototype function of the feature vector of the target signal B', deposited in a memory 150.

If this comparison is positive, that is to say that the signals match, the computing unit produces the abstracted information I, which is sent as an electronic signal I' by means of the transmitting unit 130 to the mobile terminal 400, in order to generate the visual signal 410 there.

In a preferred embodiment, the apparatus 100 moreover has a receiving unit (receiver) 140 and a return channel R that make it possible to interact with the apparatus by means of a, or the, mobile terminal 400.

Figure 2:
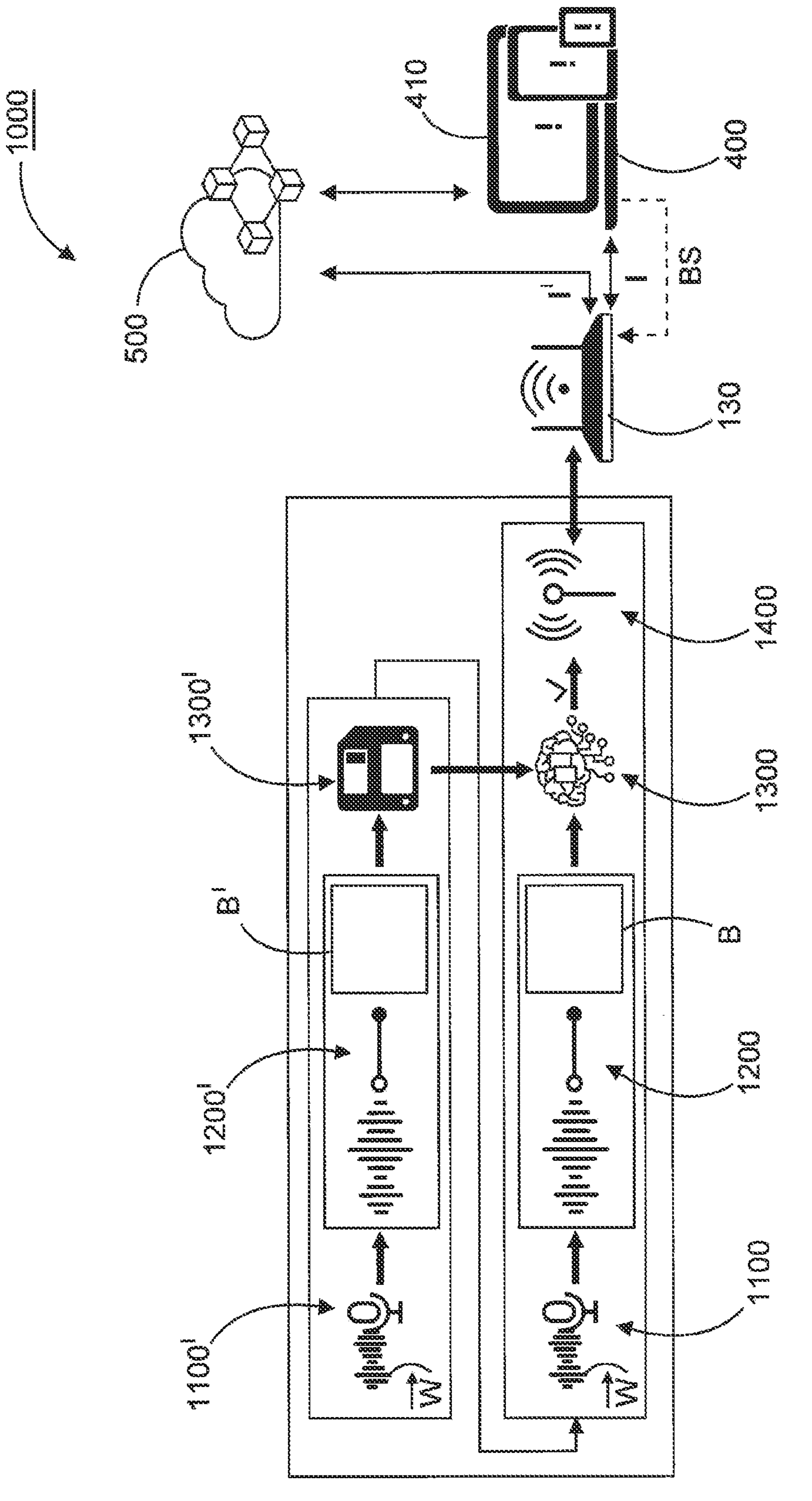
FIG. 2 shows a schematic view of a method for identifying acoustic events.

FIG. 2 shows a schematic view of a method 1000 for identifying acoustic events.

Identifying the acoustic event W requires a recording of the acoustic event W and a comparison for the acoustic event W.

For the recording of the acoustic event W, the airborne sound is recorded by means of an electroacoustic transducer in a first step 1100, broken down into an image function B by means of a transformation in a second step 1200, and a feature vector is extracted using a-priori knowledge relating to the target signal.

To be able to compare this feature vector B against a stored prototype of a feature vector of the target signal B', the acoustic event W to be identified was beforehand repeatedly also recorded in a first step 1100', broken down into an image function in a second step 1200', and a prototype of the feature vector of the target signal B' was then extracted and, in a fourth step 1300', stored.

The comparison 1300 of the prototype of the feature vector of the target signal against the stored image function may be accomplished for example by means of learning vector quantization methods—if the distance between the current feature vector B and the stored prototype of the feature vector of the target signal B' is short enough, then it may be assumed that the specific acoustic information and/or warning signal W is present. If for example the ringing of a doorbell at a specific door is supposed to be monitored, a check is thus performed to ascertain whether sounds are present that correspond to the specific ringing of the doorbell.

If the comparison 1300 is positive, that is to say the current feature vector matches the stored prototype of the feature vector of the target signal, information is sent to the terminal 400, for example directly via a transmitting unit 130 of the apparatus or indirectly via the transmitting unit 130 of the apparatus and a cloud 500, or a server, that buffer-stores and/or if necessary evaluates the sent information.

The abstracted information I' may be transmitted, or sent, from the transmitting unit 130 to the, in particular mobile, terminal 400 directly, for example via a radio connection, or indirectly, for example via a cloud 500. Finally, a visual signal 410 is generated on the terminal 400.

The transmitting unit 130 may either be an integral part of the apparatus 100, that is to say for example may be in the form of a transmitting and receiving unit (TRU for short) as described hereinabove or hereinbelow, or may be of multipart design, for example as an integral transmitting and receiving unit and a WLAN router with a DSL modem, that is to say an additional piece of equipment that provides a network for the apparatus 100.

In a preferred embodiment, the transmitting unit 130 is moreover configured by means of a return channel to receive information from the terminal, such as for example an acknowledgement BS that the abstracted information has arrived.

Figure 3:
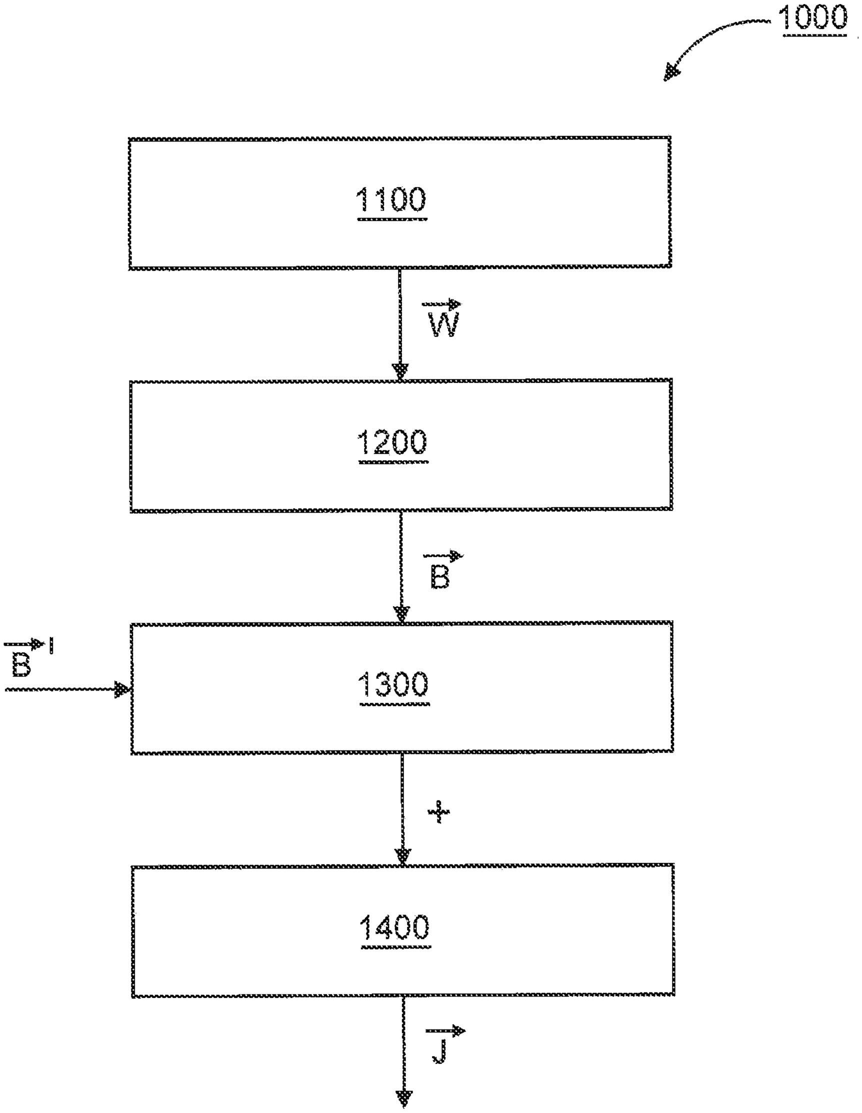
FIG. 3 shows a schematic sequence of a method for identifying acoustic events.

FIG. 3 shows a schematic sequence of a method for identifying acoustic events.

In a first step 1100, the airborne sound is recorded by means of an electroacoustic transducer, in particular a microphone, in order to obtain an electronic transducer signal W.

Next, in a second step 1200, the electronic transducer signal is broken down into an image function by means of a transformation, in particular a Fourier transformation, preferably a short-time Fourier transformation, and a feature vector B is extracted using a-priori knowledge relating to the target signal.

This feature vector B is then compared against a stored prototype of the feature function of the target signal B' in a third step 1300.

If this comparison is positive +, that is to say if the feature vector B is at a determined maximum distance from the stored prototype of the feature function of the target signal B', information I is sent to a terminal, in particular to a mobile terminal, in a last step 1400.

Figure 4:
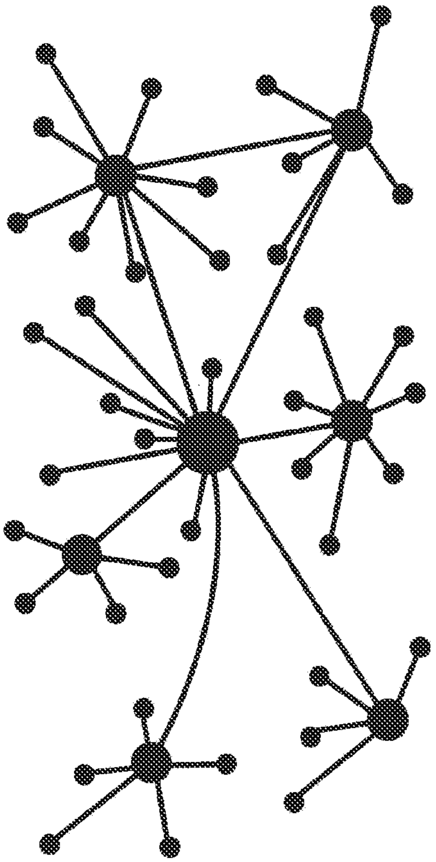
FIG. 4 shows the structure and design of a blockchain technology.
Figure 4:
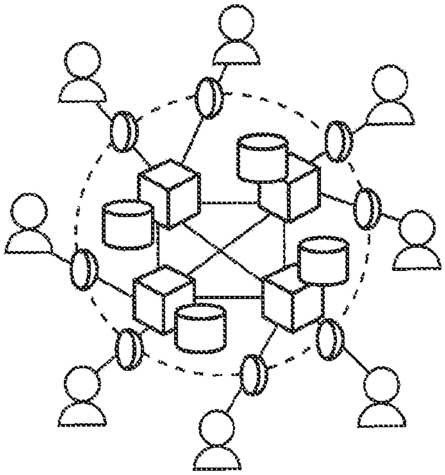

FIG. 4 shows a blockchain (structure) 510, as is used for example in the method described hereinabove or hereinbelow.

The peer-to-peer transmission of the signal in this case takes place via a decentralized and constantly plausibilized database, that is to say by means of a decentralized structure.

Figure 5:
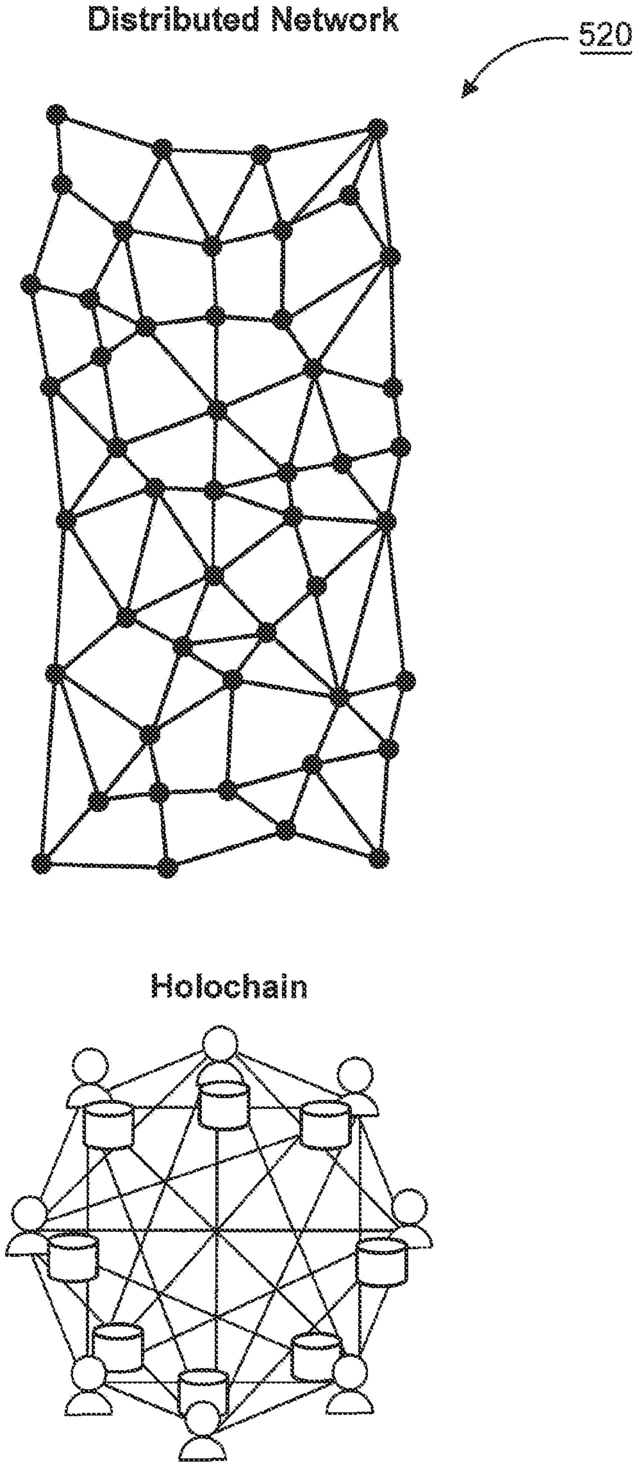
FIG. 5 shows the structure and design of a Holochain technology.

FIG. 5 shows a Holochain (structure) 520, as is used for example in the method described hereinabove or hereinbelow.

The peer-to-peer transmission of the signal in this case takes place via a distributed and constantly plausibilized database, that is to say by means of a distributed structure.

The fundamental difference between the blockchain and the Holochain is thus the type and design of the network and the form of the authentication.

LIST OF REFERENCE SIGNS

100 apparatus for identifying acoustic events
110 electroacoustic transducer, in particular microphone
120 computing unit
130 transmitting unit
140 receiving unit
150 memory
145 return channel
200 doorbell
300 door
400 mobile terminal
410 visual signal
500 peer-to-peer connection/blockchain/cloud
510 blockchain
520 Holochain
A response of the mobile terminal
B feature vector produced from image function
B' prototype of the feature vector of the target signal, produced from image function
BS acknowledgement
I abstracted information
I' sent abstracted information
R return channel
W warning signal
W' processed warning signal

The invention claimed is:

1. An apparatus for identifying acoustic events, comprising:
- an electroacoustic transducer configured to identify an acoustic event by airborne sound,
- a processor configured to receive the acoustic event and create at least one piece of information that is indicative of the acoustic event or displays the acoustic event, and
- a transmitter configured to transmit the at least one piece of information to a terminal to indicate the acoustic event on the terminal,
- wherein the processor is configured to break down the acoustic event using a Fourier transformation to obtain a spectrogram and compare the spectrogram with a deposited signal image of a plurality of deposited signal images.

2. The apparatus for identifying acoustic events as claimed in claim 1, wherein the transmitter is further configured to transmit the at least one piece of information to the terminal by a radio connection, wherein the radio connection is routed via a server, a cloud, blockchain, or Holochain.

3. The apparatus for identifying acoustic events as claimed in claim 1, wherein the at least one piece of information on the terminal generates a unique acoustic and/or visual signal that is indicative of the acoustic event or displays the acoustic even.

4. The apparatus for identifying acoustic events as claimed in claim 1, further comprising:
- a memory configured to document a plurality of acoustic events and/or store the plurality of deposited signal images.

5. The apparatus for identifying acoustic events as claimed in claim 1, wherein the at least one piece of information is created only if the spectrogram matches the deposited signal image.

6. The apparatus for identifying acoustic events as claimed in claim 1, wherein the processor is configured identify one or more of the following signals:
- an acoustic signal of a bell,
- an acoustic signal of a doorbell,
- an acoustic signal of a smoke alarm,
- an acoustic signal of a gas alarm,
- an acoustic signal of an entry detector,
- an acoustic signal of a motion detector, and
- an acoustic signal of a personal digital assistant.

7. The apparatus for identifying acoustic events as claimed in claim 1, further comprising:
- a receiver configured to receive a signal sent by the mobile terminal as a response to the at least one piece of information, and/or
- a receiver configured to learn from user feedback via a user interface on the mobile terminal whether a signal has been correctly identified.

8. The apparatus for identifying acoustic events as claimed in claim 1, further comprising:
- a return channel configured to receive commands from the terminal and to execute the received commands by means of a voice message.

9. The apparatus for identifying acoustic events as claimed in claim 1, wherein the acoustic event includes acoustic information and/or warning signals is produced by a mechanical and/or electrical apparatus.

10. The apparatus for identifying acoustic events as claimed in claim 1, wherein the acoustic events include at least one of acoustic information or warning signals.

11. The apparatus for identifying acoustic events as claimed in claim 1, wherein the electroacoustic transducer is a microphone.

12. The apparatus for identifying acoustic events as claimed in claim 2, wherein the radio connection is routed via the server, the cloud, blockchain, or Holochain via a peer-to-peer connection directly to the terminal via a decentralized database.

* * * * *